E. RIMAILHO.
SEMI-AUTOMATICALLY OPERATED GUN BREECH MECHANISM.
APPLICATION FILED JUNE 10, 1915.

1,232,090.

Patented July 3, 1917.
10 SHEETS—SHEET 1.

WITNESSES

INVENTOR
Emile Rimailho
BY
ATTORNEYS

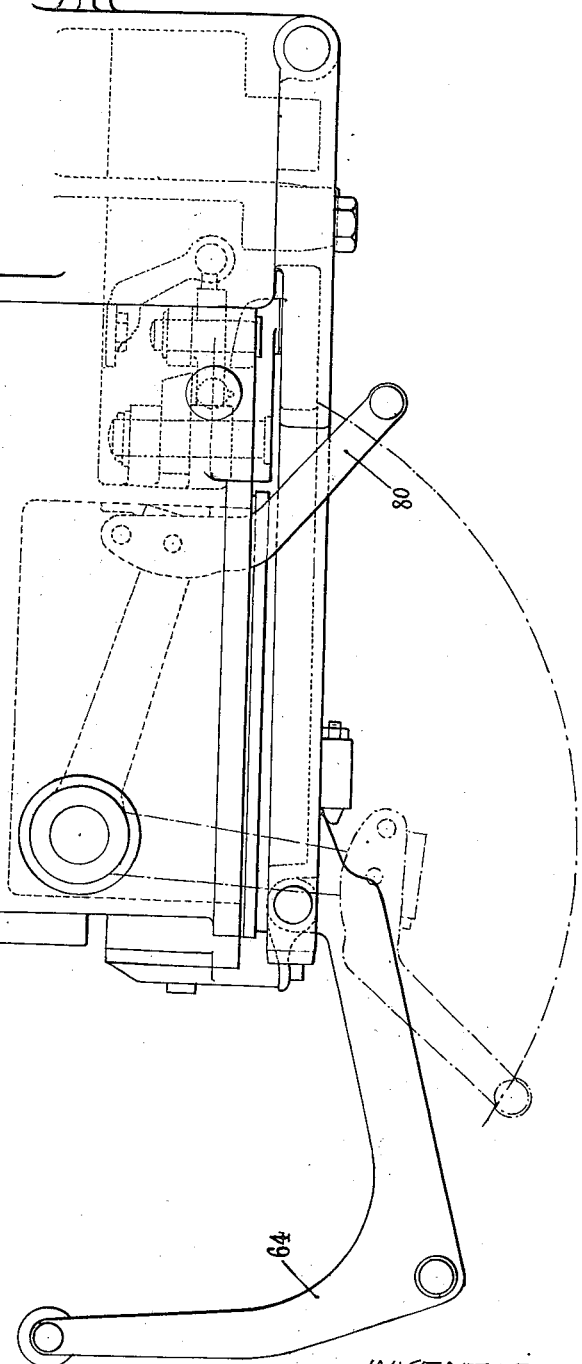

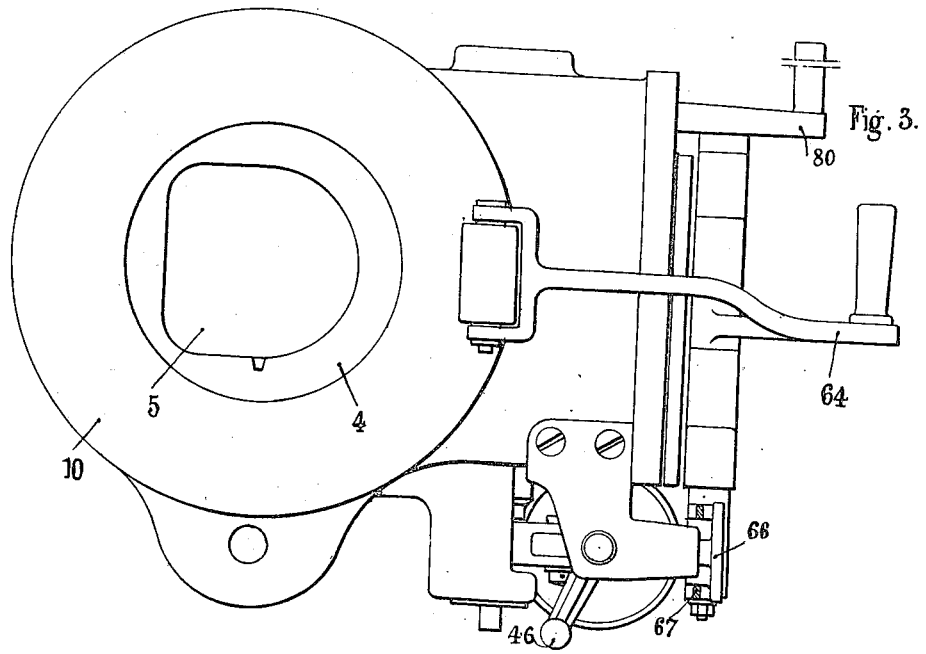
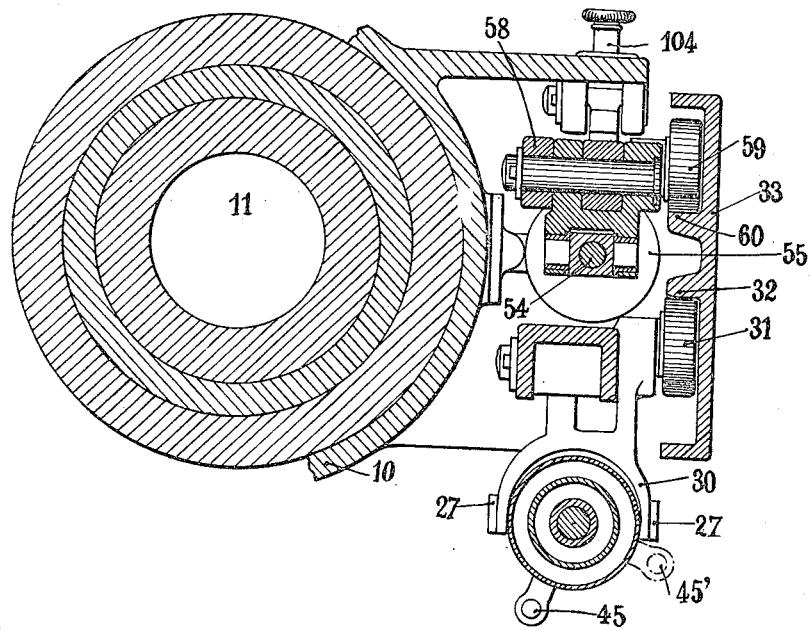

E. RIMAILHO.
SEMI-AUTOMATICALLY OPERATED GUN BREECH MECHANISM.
APPLICATION FILED JUNE 10, 1915.

1,232,090.

Patented July 3, 1917.
10 SHEETS—SHEET 4.

WITNESSES

INVENTOR
Emile Rimailho
BY
ATTORNEYS

E. RIMAILHO.
SEMI-AUTOMATICALLY OPERATED GUN BREECH MECHANISM.
APPLICATION FILED JUNE 10, 1915.

1,232,090.

Patented July 3, 1917.
10 SHEETS—SHEET 7.

E. RIMAILHO.
SEMI-AUTOMATICALLY OPERATED GUN BREECH MECHANISM.
APPLICATION FILED JUNE 10, 1915.

1,232,090.

Patented July 3, 1917.
10 SHEETS—SHEET 8.

WITNESSES

INVENTOR
Emile Rimailho
BY
ATTORNEYS

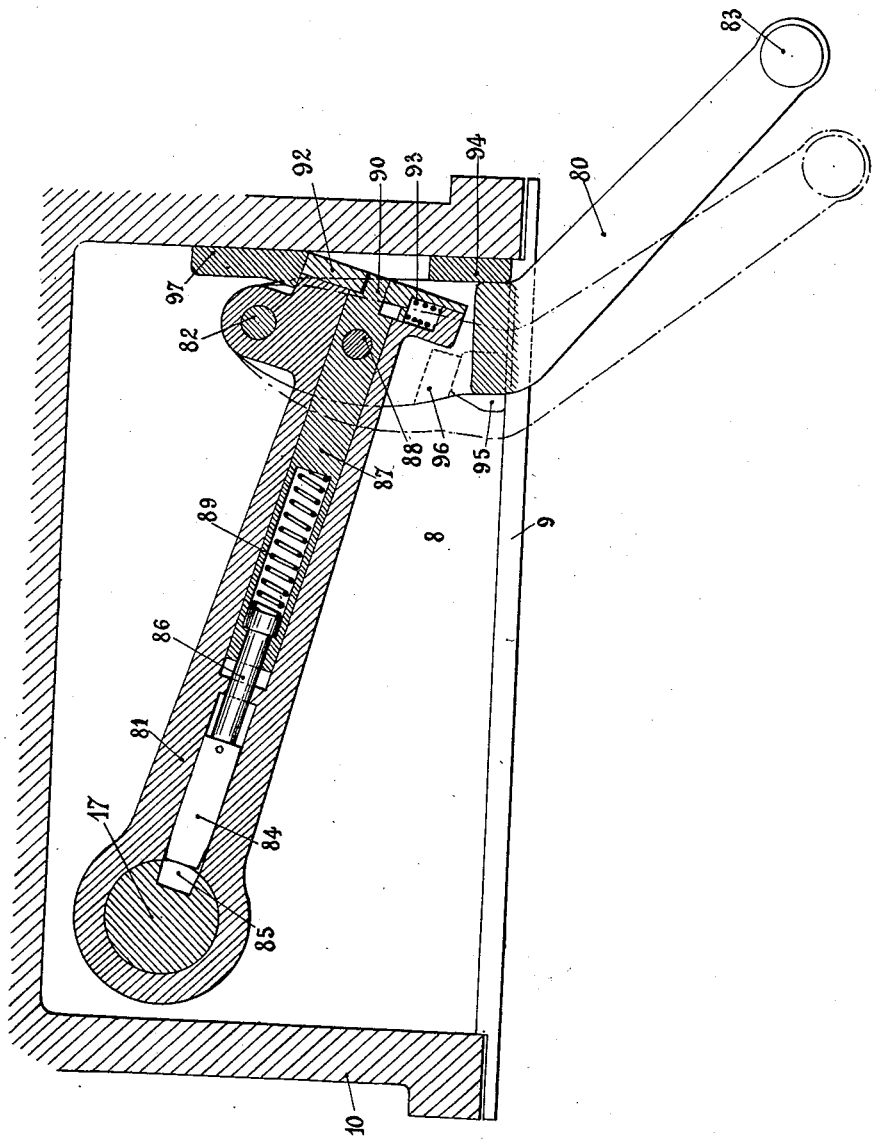

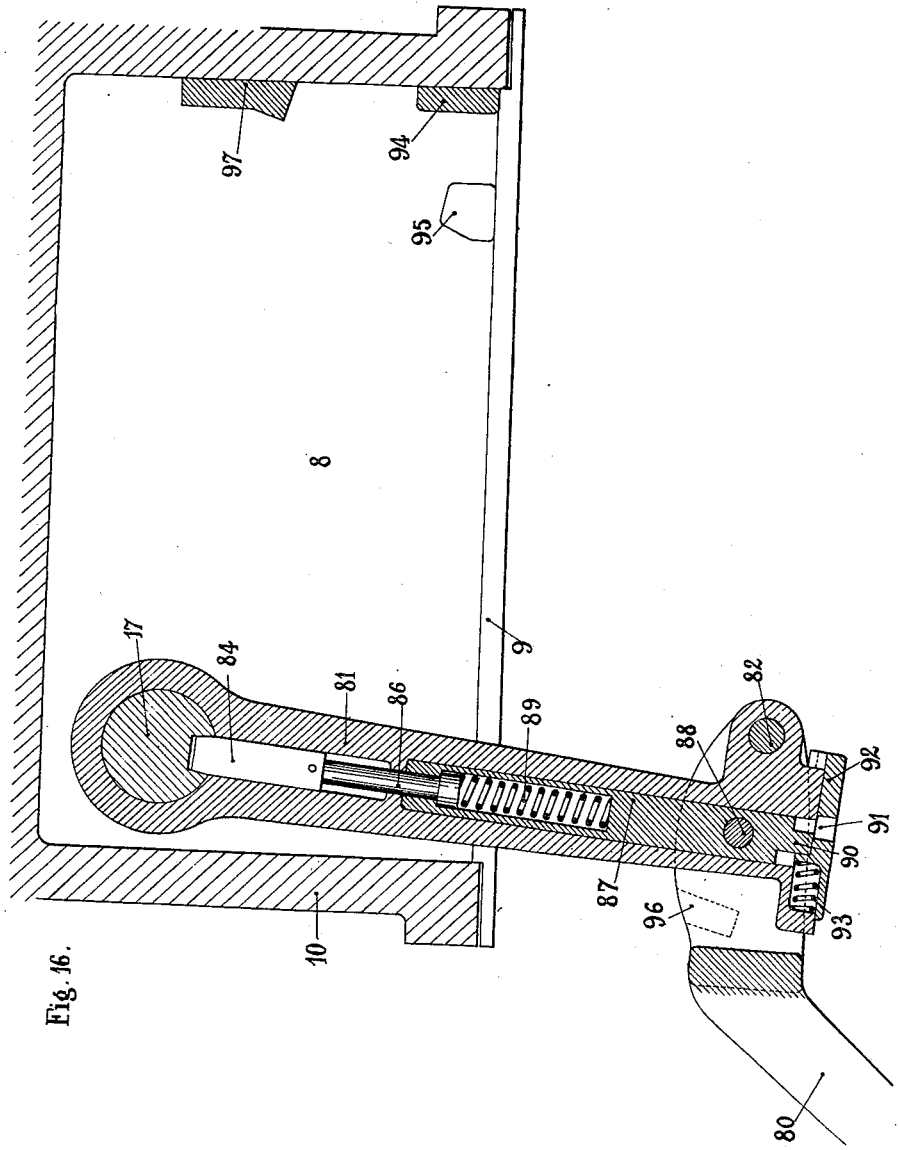

UNITED STATES PATENT OFFICE.

EMILE RIMAILHO, OF PARIS, FRANCE, ASSIGNOR TO COMPAGNIE DES FORGES ET ACIERIES DE LA MARINE ET D'HOMECOURT, OF PARIS, FRANCE.

SEMI-AUTOMATICALLY-OPERATED GUN-BREECH MECHANISM.

1,232,090. Specification of Letters Patent. Patented July 3, 1917.

Application filed June 10, 1915. Serial No. 33,419.

*To all whom it may concern:*

Be it known that I, EMILE RIMAILHO, a citizen of the French Republic, and residing in Paris, France, 98 Rue de la Victoire, consulting engineer, have invented certain new and useful Improvements in and Relating to Semi-Automatically-Operated Gun-Breech Mechanisms, of which the following is a complete specification.

This invention relates to semi-automatically operated gun breech mechanisms, in which a portion of the momentum of the recoil is stored by springs for producing the operation of the breech block and the ejection.

In the accompanying drawing which illustrate, by way of example, a constructional form of a mechanism for sliding breech blocks applied to a gun using metallic cartridges:

Fig. 2 is a partial plan of Fig. 1,

Fig. 3 is a rear view of the gun, and

Fig. 4 is a section through the breech mechanism,

Figure 5:
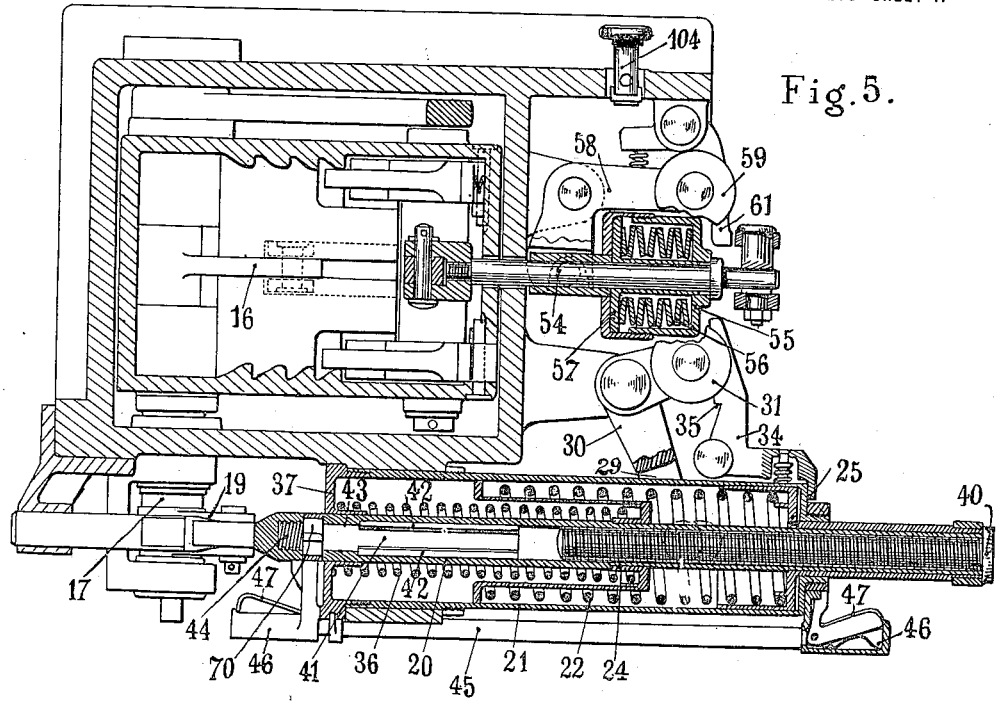
Fig. 5 is a longitudinal vertical section showing the breech and its mechanism.
Figure 6:
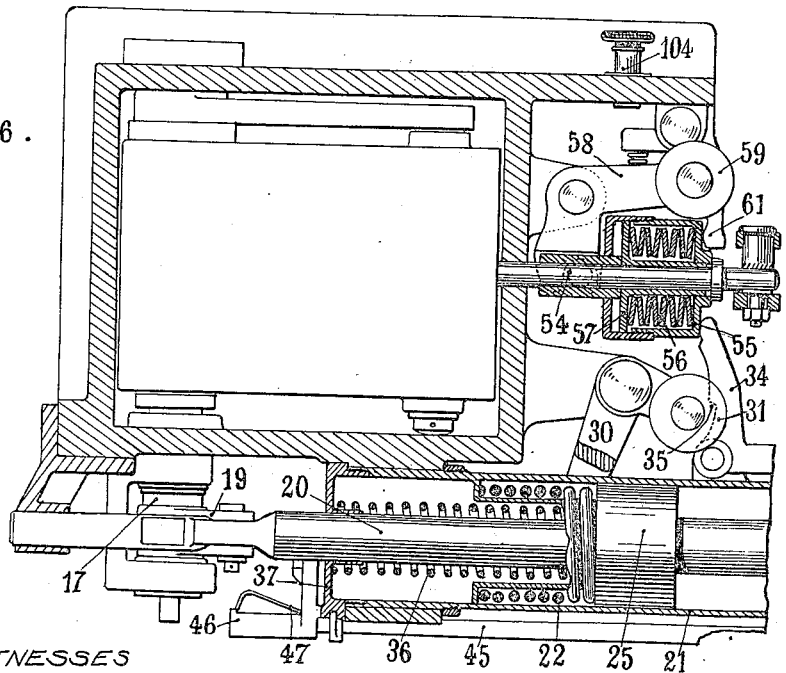
Figure 7:
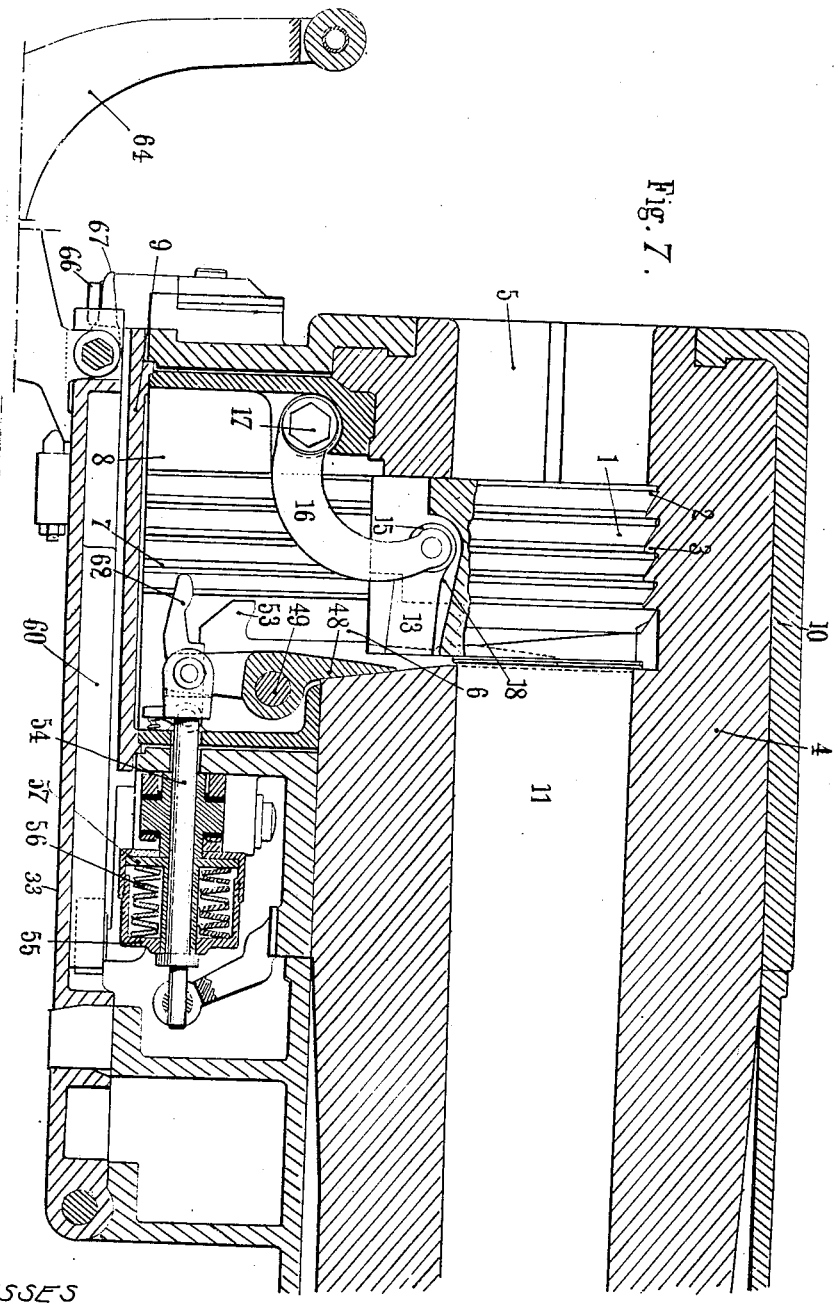
Figure 8:
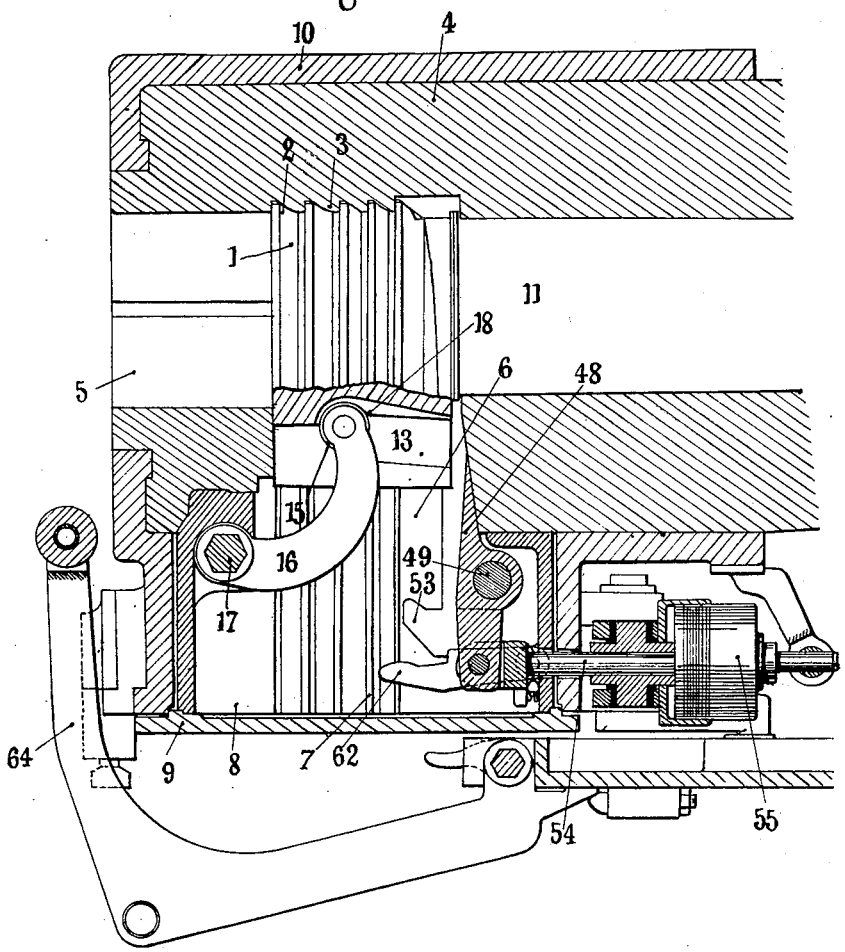
Figure 9:
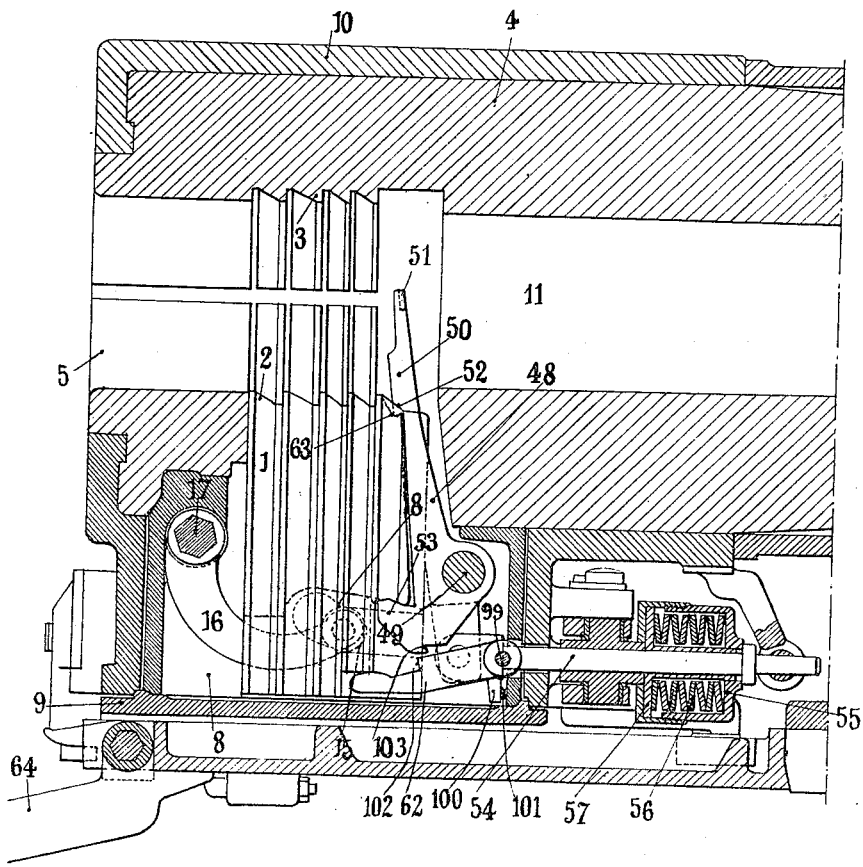
Figure 12:
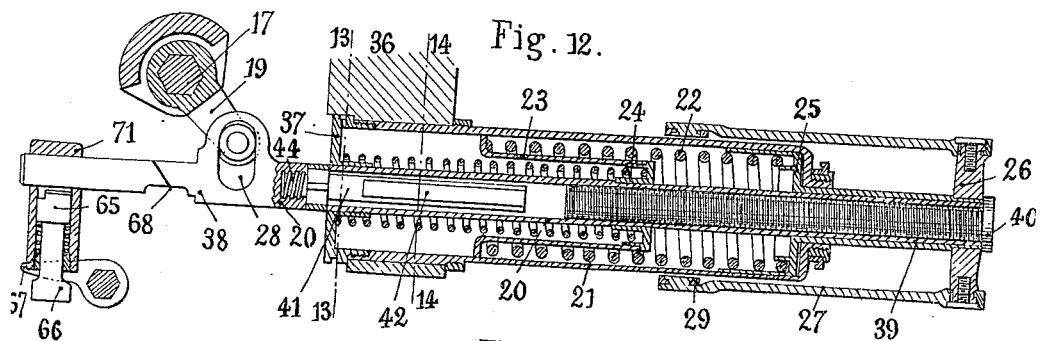
Figures 13, 14:
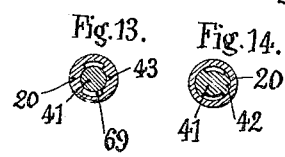

Fig. 6 is a similar view to Fig. 5, showing the elements in a different position, Fig. 7 is a horizontal section through the breech, Fig. 8 is a similar view to Fig. 7, showing the ejection members in the position of recoil of the gun, Fig. 9 is a sectional view showing the breech in an open position, Figs. 10 to 14 are detail sectional views of the breech controlling mechanism, Figs. 13 and 14 being, respectively, sections taken on lines 13—13 and 14—14 of Fig. 12, Figs. 15 and 16 illustrate in section a detail of the hand operating mechanism of the breech, in two different positions.

The breech comprises a closure block 1 sliding horizontally automatically or by hand, as desired.

The breech block 1 of rectangular shape, is formed upon its three faces with threads 2 engaging in the closed position, in threads 3 formed in the breech end 4 of the gun (Figs. 7 to 9). This breech end of the gun is open toward the rear at 5, for loading purposes, and toward the side, at 6 (Fig. 7) for the displacement of the block 1. Guiding grooves 7 corresponding to the threads formed on the breech block, are extended into a rectangular guiding frame 8 maintained against the gun by means of a closing plate 9 connected with the sleeve 10. A known system of brakes and recuperators (not illustrated) may be interposed between the sleeve and the cradle 12.

The breech block 1 is formed with a guiding groove or slot 13 in which a roller 15 slides, carried by the end of an arm 16 keyed upon a vertical controlling shaft 17. The end 18 of the guiding slot 13, is deviated so as to become concentric with the controlling shaft 17 in the closed position of the breech in order to oppose the rebound of the block 1 after closure.

The automatic breech controlling mechanism is as follows:—

Upon the vertical shaft 17 an arm 19 is mounted (Figs. 5, 6 and 10 to 12) the end of which engages in the slot 28 of a controlling rod 20 traversing in direction of its axis, the casing 21 of a recuperating spring 22. The rear end of this spring 22 bears, through the medium of a compression sleeve 23, upon a shoulder 24 formed on the controlling rod 20; its other end abuts against a compression piston 25 projecting through the front of the casing 21 and is connected by means of a cross-member 26 with two small rods 27 pivoted to the arms 29 of a forked lever 30 for opening the breech. This lever supports a roller 31 (Figs. 4 and 6) arranged opposite a fixed abutment 32 provided on a supporting arm 33 which is connected with the cradle and a spring controlled finger 34 (Fig. 5) formed with a set-back 35, is arranged in front of the opening lever 30. The fixed abutment 32 has an inclined portion, the maximum length of which equals the minimum recoil of the gun, extended by a portion parallel to the axis of the gun. The outline of the inclined portion may be straight, progressively inclined or have any suitable form.

A second spring 36 producing the closure, is located in the casing 21 concentrically with and at the rear of the opening spring 22, and is imprisoned between the compression sleeve 23 and the rear end 37 of the casing 27.

In order to permit of the disengagement of the automatic operation and rendering the manual operation possible, the automatic controlling rod 20 (Fig. 10) is in three sections, the rear section 38 being always connected with the vertical controlling shaft 17; the forward section 39 is tubular and is formed with the shoulder 24 forming an abutment for the compression sleeve 23 and a head 40 limiting the projection of the compression piston 25; these two sections 38 and 39 are positively directed and can not rotate in their guides; finally, the central section 41, screwed at 44 into the rear section 38, is connected with the forward section by means of two longitudinal projections 42 abutting against an internal flange 43 (Figs. 5, 13 and 14); a rotation through a quarter of a revolution imparted to this central section brings the projections 42 opposite two grooves or slots 69 formed in the flange 43 in which they are adapted to slide without, however, completely disengaging themselves during the opening and closing operations.

A further effect of the rotation, by unscrewing the rear section 38, is to allow the compression piston 25 to rest upon the forward end of the casing 21 in order to limit the forward movement under the action of the springs and permit of a subsequent engagement of the organs controlling the automatic operation.

The disengagement of parts 42 and 43 is obtained by means of a rod 45 (Figs. 5 and 6) arranged parallel to the casing 21 and provided with handles 46. This rod which is constituted by two sections assembled telescopically, is connected with a square portion 70 formed on the central section 41 of the operating rod. It is thus possible to cause the rod 45 turning around the casing 21, to operate the central section 41 of the said rod, in its movement. Spring controlled pawls 47 (Fig. 5) provided at each end of the rod 45, permit of locking the latter in either of its extreme positions.

The arrangement for manually operating the breech, comprises a lever having two sections 80 and 81, pivotally connected by the pin 82 and capable of a slight angular movement relatively to each other.

The external part 80 carries at its end an operating handle 83, while its other end forms a fork for the end of the arm 81. The latter is loosely mounted on the breech operating shaft 17, but may be locked thereto by a pin 84 sliding in the interior of the arm and penetrating a recess 85 formed in the shaft 17.

The pin 84 is connected by a rod 86 with a piston 87 also sliding in the interior of the arm 81 and is connected with the arm 80 by a pin 88. A spring 89 is interposed between the piston 87 and the rod 86 permitting, if required, a telescoping of these two elements.

The end of the piston 87 forms a pin 90 engaged in an opening 91 of a plate 92 sliding transversely upon the end of the arm 81 under the pressure of a spring 93.

In the inoperative or idle position, the lever 80 bears, at the forward end, on a stop or abutment 94 provided on the securing ring 10; a stop 95 on the upper part of the guide frame 8 is in engagement with a projection 96 provided on the lever 80, the engaging surfaces being cylindrical and concentric with the pin 82.

Finally, a third stop 97 carried by the securing ring, is engaged by both the end of the arm 81 and the sliding plate 92.

In this position, the pin 84 being disengaged from the recess 85, the arm 81 is independent of the shaft 17 and maintained between the stops 97 and 95, it cannot receive any rotary movement as long as the lever 80 is not acted upon; at the moment of firing the inertia of this arm can only press it against the stop 94 and the system is not subjected to any displacement.

The ejecting mechanism comprises an ejector 48 (Figs. 7 to 9) movable around a vertical shaft 49 and provided with two arms 50 terminated by claws 51 borne on by the flange of the cartridge case, at the ends of a vertical diameter, when the gun is loaded. This ejector is formed with two noses 52 (Fig. 9) and two heel portions 53 (Fig. 8) projecting on the side of the breech block.

It is pivotally connected with the controlling rod 54 connected with the end of a cylindrical casing 55 containing springs, such as, for instance, Belleville washers 56 which constitute recuperators of energy for ejecting purposes.

Figure 1:
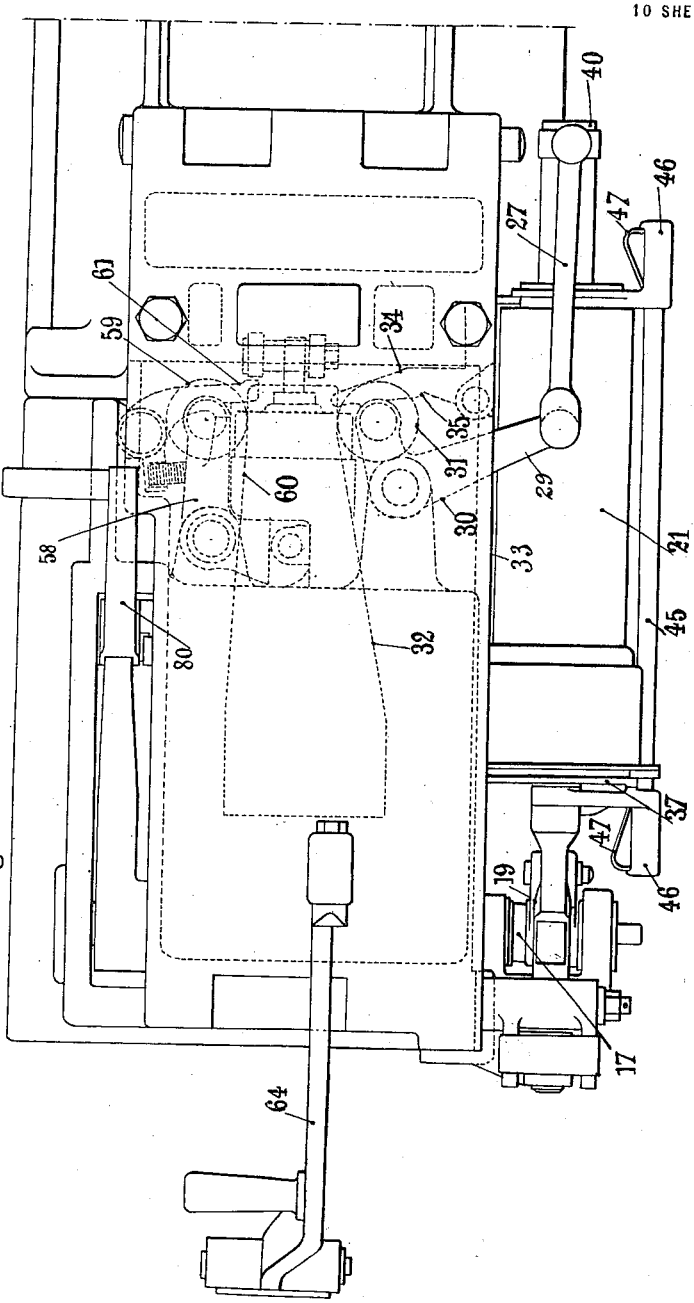
Figure 1 is an external elevation.

At the other end of the casing 55, a compression piston 57 (Figs. 5 and 6), is provided, for compressing these washers, connected to a device similar to that which compresses the opening recuperating spring 22, and formed by a forked lever 58 with a roller 59 (Figs. 1 and 4) arranged in front of a fixed abutment 60 of similar form to the abutment 32, carried by the arm 33 and a spring controlled finger 61 for engaging purposes.

In proximity to the heel portions 53 of the ejector there are disposed two tripping dogs 62 (Figs. 5 and 9) each of which is pivotally mounted on an axis 99 mounted in lugs belonging to the breech, and comprises a heel portion 100 acted upon by a spring 101 which bears on the wall of the guide frame. Each of these tripping dogs is formed with a projection 102 which the spring 101 constantly tends to bring into engagement with a correspondingly positioned shoulder 103 formed on the corresponding ejecting heel portion 53.

Upon the arm 33 a loading lever 64 is pivotally mounted, provided with an operating handle, and comprising a heel portion 67 located opposite the head 66 of spring lock 65 mounted in the guiding block 71 of the rear section 38 of the sliding rod. The latter has at a suitable point, a recess 68 adapted to be penetrated, in a suitable position, by the bolt 65.

The operation is as follows:—

During the recoil of the gun after the firing of a shot, the rollers 31 and 59 mounted respectively on the opening forked lever 30 and upon the ejecting forked lever 58, roll on the fixed abutments 32 and 60. The movement of the roller 31 is transmitted by small rods 27 and the cross-member 26 to the compression piston 25 which compresses the opening spring 22 by bringing the same into the position illustrated in Fig. 11. The compression sleeve 23 being maintained fixed by the shoulder 24 of the rod 20, the recuperating spring 22 remains compressed, the end of the lever 30 being maintained in the depressed position by the dog 35 of the spring pawl 34 (Fig. 6).

During this compression of the opening recuperating spring 22, the roller 59 produces, furthermore, by the oscillation of the lever 58 the compression of springs 56 in the casing 55, and this lever 58 engages, at the end of the travel, underneath the spring controlled pawl 61, thus maintaining the springs in a compressed condition (Fig. 6). The action of these springs is also supported by the tripping dogs 62 the projections 102 of which are in engagement with the projections 103 of the heel portions 53 and prevent any movement of the ejector.

Figure 10:
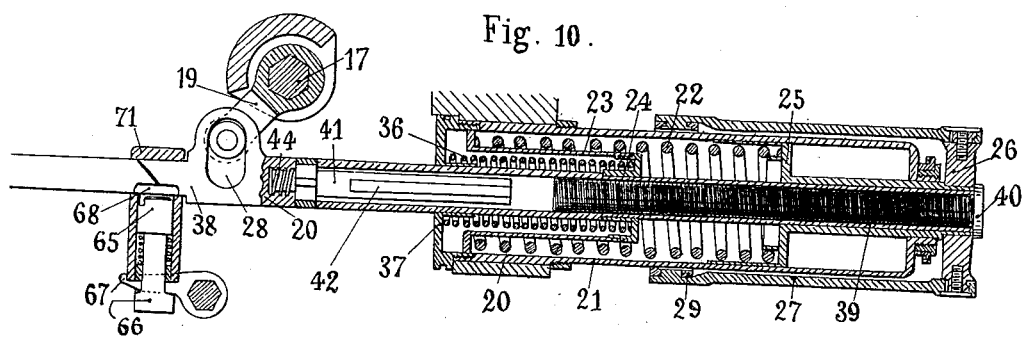
Figure 11:
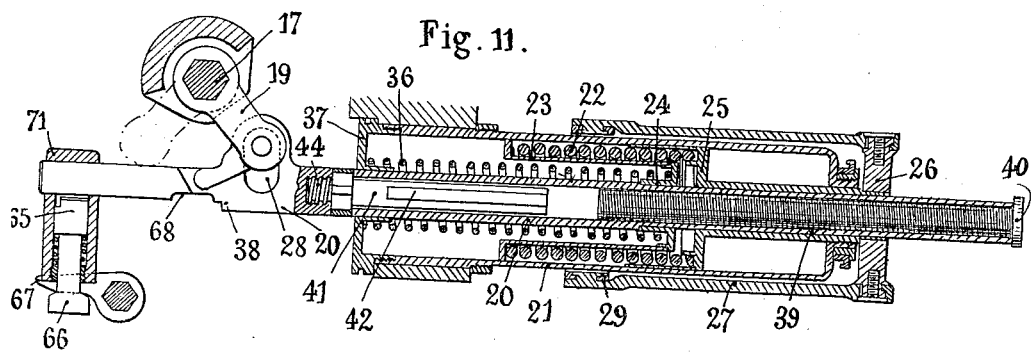

When during the recoil, the spring 22 has been compressed to a sufficient extent in order to possess the necessary force, it acts on the vertical shaft 17 and causes its oscillation thus causing the breech block to slide into the open position illustrated in Fig. 9, this release of the spring 22 compressing the closing spring 36 (Fig. 10).

At the end of the opening movement of the breech, the block 1 pushes the tripping dogs 62 back and frees the ejector which is oscillated by rod 54 under the action of the Belleville washers 56 and projects the cartridge case out of the chamber. At the moment the tripping dogs are operated, the block 1 strikes also the heel portions 53 thereby facilitating the disengagement of the cartridge case.

This oscillation of the ejector produces the release of the springs 56 and the forward movement of the casing 55 (Fig. 6) the latter pushing back the spring controlled pawls 61 and 34 of the forked levers 58 and 29, 30 respectively. The latter are thereby released and render possible, on the one hand, the return of the ejector, and on the other, the closure of the breech.

In this position, the ejector being displaced toward the rear, its dogs 52 engage with the projections 63 of the breech block (Fig. 9) and prevent the same from closing as long as the gun is not loaded. The closure spring 36 therefore remains compressed in the position illustrated in Fig. 10.

In order to re-load the gun, the cartridge is introduced into the chamber 11 and pushed completely home by making use of the rammer 64 which with its end bears on the end of the cartridge case. During this displacement of the rammer, its heel portion 67 ceases to bear on the head 66 of the locking bolt. The members occupying the position of open breech illustrated in Fig. 10, the bolt 65 now faces the recess 68 into which it penetrates under the action of its spring, the heel portion 67 no longer opposing its movement. The rod 20 is thereby locked in place so that the breech block is maintained in the open position notwithstanding that owing to the action of the rammer pushing the cartridge home, the ejector has been applied against the edge of the opening of the breech, by bringing the nose 52 of the ejector out of engagement with the recess 63 of the breech block. When the rammer returns to its idle position, it raises the head 66 of the lock 65 thereby disengaging the rod 20 so that the closure spring 36 becomes operative in order to produce the closure of the breech.

The width of the safety catch 68 is such that at the moment the edge of this catch comes into contact with the bolt 65, the forward face of the breech block 1 is already engaged at the rear of the breech.

The closure of the breech is therefore rendered impossible after its liberation by the ejector as long as the rammer has not been returned to its inoperative position. For heavy ordnance, the automatic ramming home of the projectile may be accomplished by means of a known device, the lever 64 serving to put the powder case in place by hand, constituting the last element of the charge.

As illustrated in Figs. 1 and 4 to 6, a bayonet lock 104 may be provided for locking the spring controlled pawl 61 of the forked lever 58 of the ejector, the ejection being then solely controlled by the impact of the breech block 1 on the heel portions 53 of the ejector.

The lock 104 consists of a stem provided with a pin which has for its object to maintain the stem either in the position shown in Figs. 4 to 6 or in contact with the pawl 61.

In order to operate the breech by hand, the rod 45 is brought into the position 45' shown in Fig. 4. To this end, the handles 46 are acted upon, compressing the spring locks 47 which being subsequently released, lock the rod 45 in its new position. In this position, the projections 42 (Figs. 5 and 12 to 14) are opposite recesses formed in the flange 43 thereby permitting of a relative longitudinal movement of the elements of the rod 20. The lever 80 is then operated which for the open position of the breech, will occupy the position shown in dash-dotted lines in Fig. 2. The rotation of this lever, first around the joint 82, has for its effect to disengage the projection 96 from the abutment 95 at the same time as the piston 87, operated by the pin 88, moves away from the plate 92 and causes the pin 84 to penetrate the recess 85 of the shaft 17.

As soon as the projection 96 is disengaged from its abutment, the rotary movement continues around the shaft 17 which is operated and opens the breech. If the opening movement has already been initiated, the spring 89 contracts until the pin 84 reaching a position opposite the recess 85, penetrates the same and connects the arm 81 with the shaft 17 for the remainder of the movement. At the beginning of this rotary movement, the plate 92 no longer being maintained by the abutment 97, slides under the action of its spring 93 and thereby prevents the return of the piston 87 and the disengagement of the pin 84 until the end of the following closing movement.

The following are the advantages:—

The interposition between the recoiling mass of the gun and the energy recuperators intended to insure the operation of the elements, of a lever controlled by an inclined abutment, permits of causing these recuperators to effect a travel less than that of the gun, so that the spring of the recuperator need not be as long as those used in the ordinary recuperators of this kind. In certain cases, on the contrary, where it would be necessary to have a compression stroke greater than the recoil of the gun, this result may be obtained by suitably designing the ratio of the arms of the forked lever. In all cases, the recoiling mass of the gun acts only during a predetermined portion of its travel on the means for operating the recuperators, and therefore the energy stored by the latter is always the same and the operation of the members of the breech will always be effected under normal conditions in the case of possible variations in the recoil; useless over-compressions of the recuperating springs cannot take place. This arrangement permits, moreover, of the opening of the breech during the recoil thereby increasing the rapidity of the operation.

The described arrangement for the ejection of the cartridge case permits of using for this operation energy or force as great as may be necessary, independent of that for opening the breech block, without the arms of the ejector, however, having to support the least tension before they become operative and thereby interfere with the opening operation.

Finally, the use of a safety closure connected with the operation of a hand lever pushing home the charge or the last element thereof, renders any accident impossible which may result from a sudden closure during direct loading by hand, of an apparatus having a block of the kind described.

What I claim is:—

1. In a gun breech mechanism, a breech block, a spring mechanism associated therewith for operating the block, a lever for operating the spring mechanism, and a non-recoiling member of the gun having a cam surface engaged by the lever whereby the spring mechanism is compressed upon the recoil of the gun, thereby operating the block during the last part of the recoil substantially as described.

2. In a gun breech mechanism, a breech block mounted to slide transversely of the gun bore, a spring mechanism for sliding the block during the last part of the recoil, a lever, including means for operating the spring mechanism, a member relatively stationary to the spring mechanism and the lever having a cam surface engaged by the lever, whereby during the recoil of the gun the lever compresses the spring mechanism, means for automatically locking the spring mechanism when the same has displaced the block from the bore of the gun, said locking means preventing an accidental displacement of the block into the bore, and means controlling said locking means, substantially as and for the purpose set forth.

3. In a gun breech mechanism, including an ejector, a spring mechanism controlling the movement of the ejector, a lever controlling the spring mechanism, a non-recoiling member of the gun having a cam surface engaged by the lever whereby, upon the recoil of the gun, the displacement of the lever relative to the member compressing the spring mechanism causes the operation of the ejector.

4. In a gun breech mechanism, a breech block, a spring mechanism for operating the breech block, a lever for energizing the spring mechanism, an ejector, a spring mechanism for operating the same, a lever for energizing the spring mechanism of the ejector, a non-recoiling member of the gun having cam surfaces engaging the levers, the recoil of the gun displacing said levers relative to the member, whereby the cam surfaces of the member cause said levers to energize the spring mechanisms of the block and ejector, locking means for the block operable by the ejector, locking means for the spring mechanism of the block adapted to maintain the same in energized position after the block has been released by the ejector, and means for operating said locking means of the spring mechanism whereby the latter will move the block into the gun.

5. In a gun breech mechanism, a breech block, a spring mechanism for operating the block, a lever controlling the spring mechanism, an ejector for the gun, a spring mechanism for operating the ejector, means locking the ejector against operation by the energized spring mechanism, a lever controlling the spring mechanism of the ejector, a non-recoiling member of the gun having cam surfaces for said levers whereby said levers are operated during their displacement relative to said member and whereby said spring mechanisms are energized, said breech block having means adapted to operate the ejector locking means to release the ejector when the breech block is displaced from the gun bore, whereby the ejector is operated by its spring mechanism, locking means operable by the displacement of the ejector whereby the breech block is prevented from moving into the bore of the gun under the action of its spring mechanism, gun loading mechanism, and locking means for the spring mechanism of the block associated with the gun-loading mechanism whereby the said spring mechanism is maintained energized during the loading of the gun, substantially as and for the purpose set forth.

6. In a gun breech mechanism, a breech block mounted to slide transversely of the gun bore, a spring mechanism for operating the breech block, a lever for operating the spring mechanism, an ejector, a spring mechanism for the ejector, means for locking the ejector when the breech block is in the bore, a lever for operating said spring mechanism of the ejector, a non-recoil member of the gun having cam surfaces for said levers and adapted to operate the same upon recoil, whereby the spring mechanisms are energized, locking means adapted to engage the levers when the spring mechanisms are energized, the energized spring mechanism of the block causing the displacement thereof from the gun bore, said block having means adapted to operate the ejector locking means to release the ejector when said block has been displaced from the gun bore, whereby the ejector is operated by the spring mechanism, means associated with the spring mechanism of the ejector for operating the locking means of the levers, whereby the same are released, locking means for the block operable by the ejector whereby the block is prevented from moving into the bore when the lever is unlocked, gun loading mechanism and locking means for the spring mechanism of the block operable by the gun-loading mechanism whereby said spring mechanism is maintained in energized position while the gun is loaded, thus preventing an accidental displacement of the block into the gun bore.

7. In a gun breech mechanism, a breech block, an ejector, spring mechanisms for operating respectively the block and the ejector, including means for operating the block during the recoil of the gun and operating the ejector after the block has been operated, gun loading mechanism, and locking means for the spring mechanism of the block operated by the gun loading means whereby said spring mechanism cannot bring the block into the bore of the gun while the same is being loaded.

In testimony whereof I have hereunto set my hand at Saint Etienne (France), this twenty-first day of May, 1915.

EMILE RIMAILHO. [L. S.]

In the presence of two witnesses:
P. VEEPILLAY,
DAVIS B. LEVIS.